Oct. 19, 1937.  J. C. SANFORD  2,096,595
AUTOMATIC RELIEF VALVE FOR SUCTION PIPES
Filed Aug. 10, 1936
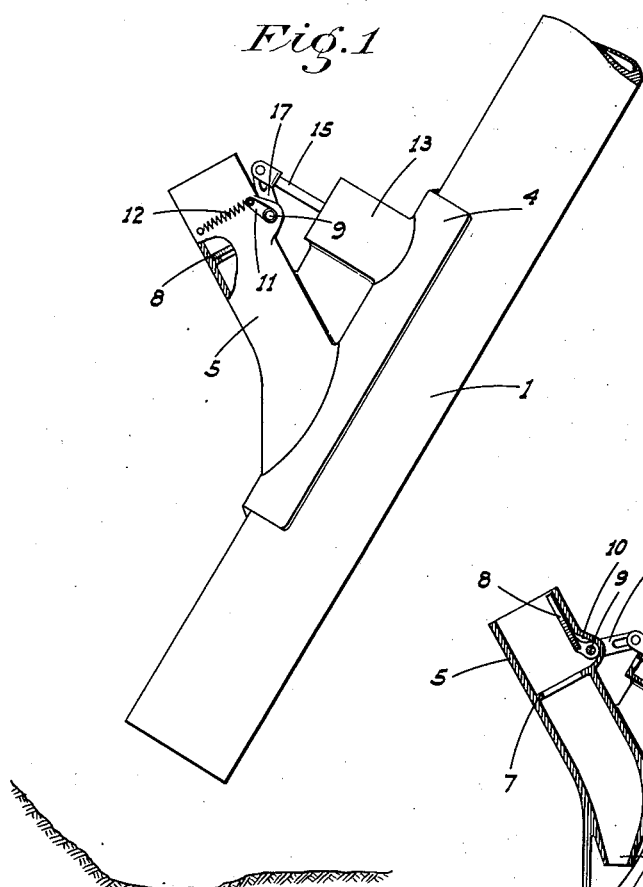
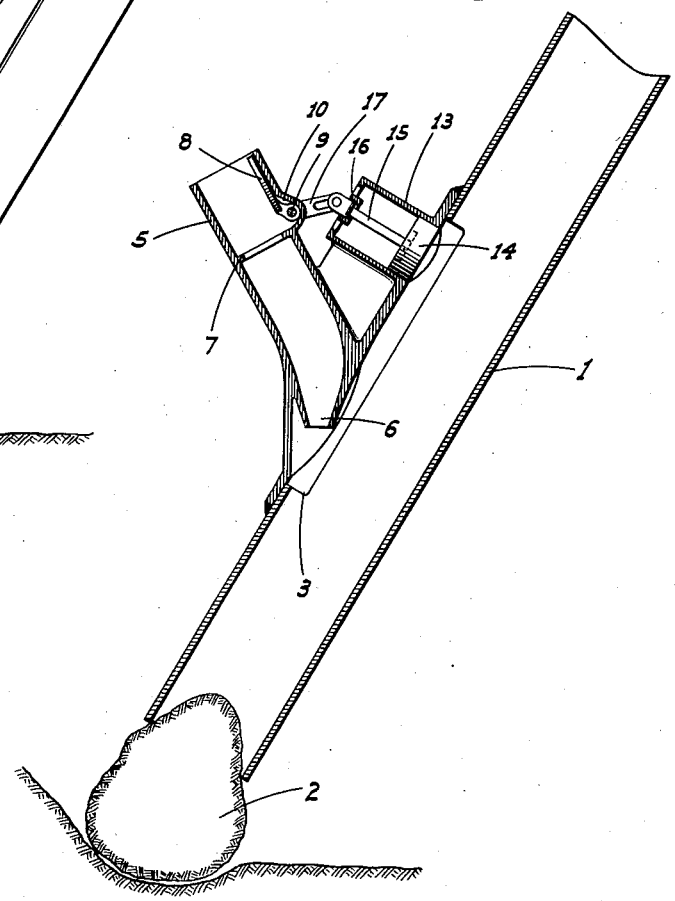
INVENTOR
J. C. Sanford
BY
ATTORNEY Patented Oct. 19, 1937

2,096,595

UNITED STATES PATENT OFFICE 2,096,595

AUTOMATIC RELIEF VALVE FOR SUCTION PIPES

Jack C. Sanford, Stockton, Calif.

Application August 10, 1936, Serial No. 95,109

2 Claims. (Cl. 37—58)

This invention relates generally to a relief valve for suction pipes and, in particular, is directed to a relief valve for use in connection with the suction pipe of a suction dredge.

In the use of suction dredges, a stoppage or "slugging" of the lower end of the suction pipe often occurs when a large piece of mud or too much mud at one time is drawn into the said intake end of the pipe. When this occurs, an exceedingly high vacuum is at once created in the suction pipe which may result in the collapse of the centrifugal pump and connected pipes. Too, if the plug of earth is drawn into the pipe and thence into the pump after a high vacuum has been created, injury is certain to result to the pump when the material strikes the same.

It is therefore my principal object to provide a relief valve which, when a stoppage occurs and a vacuum of a predetermined amount is created in the suction pipe, will automatically open and permit water to flow into the pipe and relieve the vacuum therein.

Another object of my invention is to provide a relief valve for the purpose which will operate through a continuous cycle of opening and relieving the vacuum and then closing until such time as the stoppage in the suction pipe is removed.

An additional object of the invention is to provide a nozzle in connection with the relief valve whereby the water drawn through the relief valve will tend to clear out the dirt causing the stoppage.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is a side elevation of the device as arranged in connection with the suction pipe of a dredge, and in closed position.

Figure 2 is a sectional elevation of the device in open or vacuum relieving position.

Referring now more particularly to the characters of reference on the drawing, the numeral 1 indicates the suction pipe of a suction dredge disposed in operative position. A centrifugal pump (not shown) is employed to create a suction in this pipe and to draw the mud and water therethrough as is usual. The numeral 2 indicates a "slug" of mud or clay creating a stoppage of the suction pipe 1.

The suction pipe 1, a short distance above its lower end, is cut out to form a longitudinally extending slot 3 over which a saddle 4 is secured (as by welding) in watertight connection with the pipe.

A tubular passage member 5 projects at an outward and upward slope from the saddle and is formed at its inner end with a nozzle 6 which is disposed so as to discharge into the interior of pipe 1 in a direction towards the lower or intake end of said pipe. The passage member 5 intermediate its ends is provided with an internal circumferential flange 7 which forms a seat for a valve here shown as a flap valve 8 pivoted, as at 9, in a recess 10 formed in the wall of the passage member outwardly of but adjacent the valve seat. The pivot 9 for the valve extends through each side of the recess and is provided at one end with a short arm 11. A spring 12 is secured at one end to the free end of the arm while the other end is attached to the passage member, and acts to hold the valve closed.

A cylinder 13 is mounted on the saddle above but adjacent the passage member, said cylinder being in free communication with the interior of pipe 1. A piston 14 is disposed in the cylinder and is provided with a piston rod 15 which projects through a guide spider 16. The outer end of this piston rod is pivotally connected by a suitable yoke with the slotted outer end of an arm 17 which extends radially from and is rigid with pivot 9. The face area of piston 14 is somewhat greater than the face area of flap valve 8 for the purpose as will hereinafter appear.

Operation

In use, the device is secured to the suction pipe of a dredge in the manner heretofore described. During normal operation of the dredge when water and mud are being drawn freely through the suction pipe, the valve 8 will remain closed as the differential in suction being exerted on piston 14 and valve 7 (of less face area than the piston) is not great enough to actuate the piston and open the valve against the tension of spring 12.

However, should the intake end of suction pipe 1 become obstructed by a slug of mud or the like and the suction or vacuum being to increase within pipe 1, the piston will be drawn inwardly in the cylinder and flap valve opened. The amount of vacuum required to actuate the piston and open the valve depends of course on the difference in face area of the piston and valve as well as the strength of spring 8 which normally acts to hold the flap valve closed. If desired, the spring 8 may be arranged so as to be adjustable for tension.

As the flap valve opens, water rushes into passage member 5 and through nozzle 6 where it is discharged towards the stoppage and thus tends to break up or wash away the same. Too, when the flap valve opens, the undesirable vacuum in pipe 1 is soon relieved and this in itself has a tendency to cause the slug 2 to fall free. When this occurs, flap valve 8 automatically closes. If the stoppage of pipe 1 has been eliminated, the usual dredging operation continues. However, if the stoppage remains, the flap valve will soon open again, a stream of water will enter the pipe 1 through the nozzle and the vacuum will be again relieved. It will therefore be obvious that as long as the stoppage continues, my vacuum relief device will continue to automatically and intermittently relieve the vacuum which builds up in the suction pipe.

If desired, two or more of the devices may be mounted circumferentially on a dredge suction pipe depending, of course, on their size as well as the capacity of the centrifugal pump which creates the suction. Although I have here shown a flap valve, it is obvious that other types of valves, such as the butterfly type, may of course be employed in place of the flap valve. In any event, however, a proper balance must be maintained between piston and valve in order that the device function properly.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A device for relieving excess vacuum in an underwater pipe of a suction dredge comprising in combination with said pipe, an intake passage member mounted on and in communication with the pipe at a point below the water level when the dredge is operating, a valve in said member, and vacuum responsive means disposed in communication with the pipe and arranged in connection with the valve to open the latter upon the vacuum in the pipe reaching a predetermined amount whereby to permit water to rush into the pipe and relieve the excessive vacuum.

2. A device for relieving excessive vacuum in an underwater suction pipe of a suction dredge comprising in combination with said pipe, an intake passage member mounted on and in communication with the pipe at a point adjacent its lower end and below the water level when the dredge is operating, a valve in said member, a nozzle formed on the inner end of said member and arranged to discharge into the suction pipe toward said lower end thereof, and vacuum responsive means to open the valve upon the vacuum in the pipe reaching a predetermined amount whereby to permit water to rush into the passage and discharge from the nozzle in a direction toward the said lower and adjacent end of the pipe.

JACK C. SANFORD.